(12) United States Patent
Martin et al.

(10) Patent No.: US 8,135,537 B2
(45) Date of Patent: Mar. 13, 2012

(54) ROUTE DATA BASE GENERATION PROCEDURES AND SYSTEMS, PROCESSES AND PRODUCTS RELATING THERETO

(76) Inventors: Roger L. Martin, Deltona, FL (US); Thurman Sasser, Zellwood, FL (US)

( * ) Notice: Subject to any disclaimer, the term of this patent is extended or adjusted under 35 U.S.C. 154(b) by 0 days.

(21) Appl. No.: 12/586,056

(22) Filed: Sep. 16, 2009

(65) Prior Publication Data

US 2010/0049433 A1 Feb. 25, 2010

Related U.S. Application Data

(62) Division of application No. 10/415,961, filed as application No. PCT/US00/30855 on Nov. 10, 2000, now Pat. No. 7,610,150.

(51) Int. Cl.
*G01C 21/26* (2006.01)

(52) U.S. Cl. ........ 701/201; 342/118; 342/147; 342/113; 342/133; 340/444

(58) Field of Classification Search .................. 701/200, 701/201, 205, 209; 340/988, 444; 382/242; 342/118, 147, 113, 133; *G01C 21/26*
See application file for complete search history.

(56) References Cited

U.S. PATENT DOCUMENTS

| | | | | |
|---|---|---|---|---|
| 4,055,750 A * | 10/1977 | Jellinek | ........................ | 701/207 |
| 5,245,537 A * | 9/1993 | Barber | ........................ | 473/403 |
| 5,488,559 A * | 1/1996 | Seymour | ........................ | 701/208 |
| 5,523,951 A * | 6/1996 | Kriesgman et al. | ............. | 701/21 |
| 5,524,081 A * | 6/1996 | Paul | ............................. | 701/300 |
| 5,878,369 A * | 3/1999 | Rudow et al. | ................. | 701/215 |
| 6,061,628 A * | 5/2000 | Hayashi et al. | ............... | 701/208 |
| 6,084,543 A * | 7/2000 | Iizuka | ...................... | 342/357.31 |
| 6,108,603 A * | 8/2000 | Karunanidhi | .................. | 701/208 |
| 6,401,027 B1 * | 6/2002 | Xu et al. | ........................ | 701/117 |
| 6,401,068 B1 * | 6/2002 | Cherveny et al. | ............... | 704/275 |
| 6,454,036 B1 * | 9/2002 | Airey et al. | ............. | 180/167 |
| 6,529,821 B2 * | 3/2003 | Tomasi et al. | ................. | 701/202 |
| 6,615,138 B1 * | 9/2003 | Schiffmann et al. | .......... | 701/301 |
| 6,680,694 B1 * | 1/2004 | Knockeart et al. | ....... | 342/357.09 |
| 8,041,503 B2 * | 10/2011 | Choi et al. | .................... | 701/117 |

OTHER PUBLICATIONS

Kleeman, L, "Optimal estimation of position and heading for mobile robots using ultrasonic beacons and dead-reckoning", Robotics and Automation, 1992. Proceedings., 1992 IEEE International Conference on, Digital Object Identifier: 10.1109/ROBOT.1992.220053, Publication Year: 1992 , pp. 2582-2587 vol. 3.*

Kotzin, M.D., van den Heuvel, A.P, "Dead reckoning vehicle location using a solid state rate gyro", Vehicular Technology Conference, 1978. 28th IEEE, vol. 28, Digital Object Identifier: 10.1109/VTC. 1978.1622528, Publication Year: 1978 , pp. 169-172.*

* cited by examiner

*Primary Examiner* — Tuan C. To
(74) *Attorney, Agent, or Firm* — Arthur G. Yeager, Esq.

(57) ABSTRACT

A route data base generating system avoids GPS satellite signals sources for land based vehicle azimuth and heading determinations in areas where reception of the satellite signals is unavailable or impaired and relies on vehicle part movements that are equatable to the heading and azimuth changes of the vehicle for determining such vehicle orientations. Part movements equatable to the heading changes are found in the vehicle wheel assemblies. A route data base founded on interconnecting linear route segments that are arranged in and end-to-end serial order is advocated and wherein the angular deviation between connecting segments in the order is predetermined. Various uses of the generating systems and related procedures are advocated for both on-the-road and off-road usage.

7 Claims, 8 Drawing Sheets

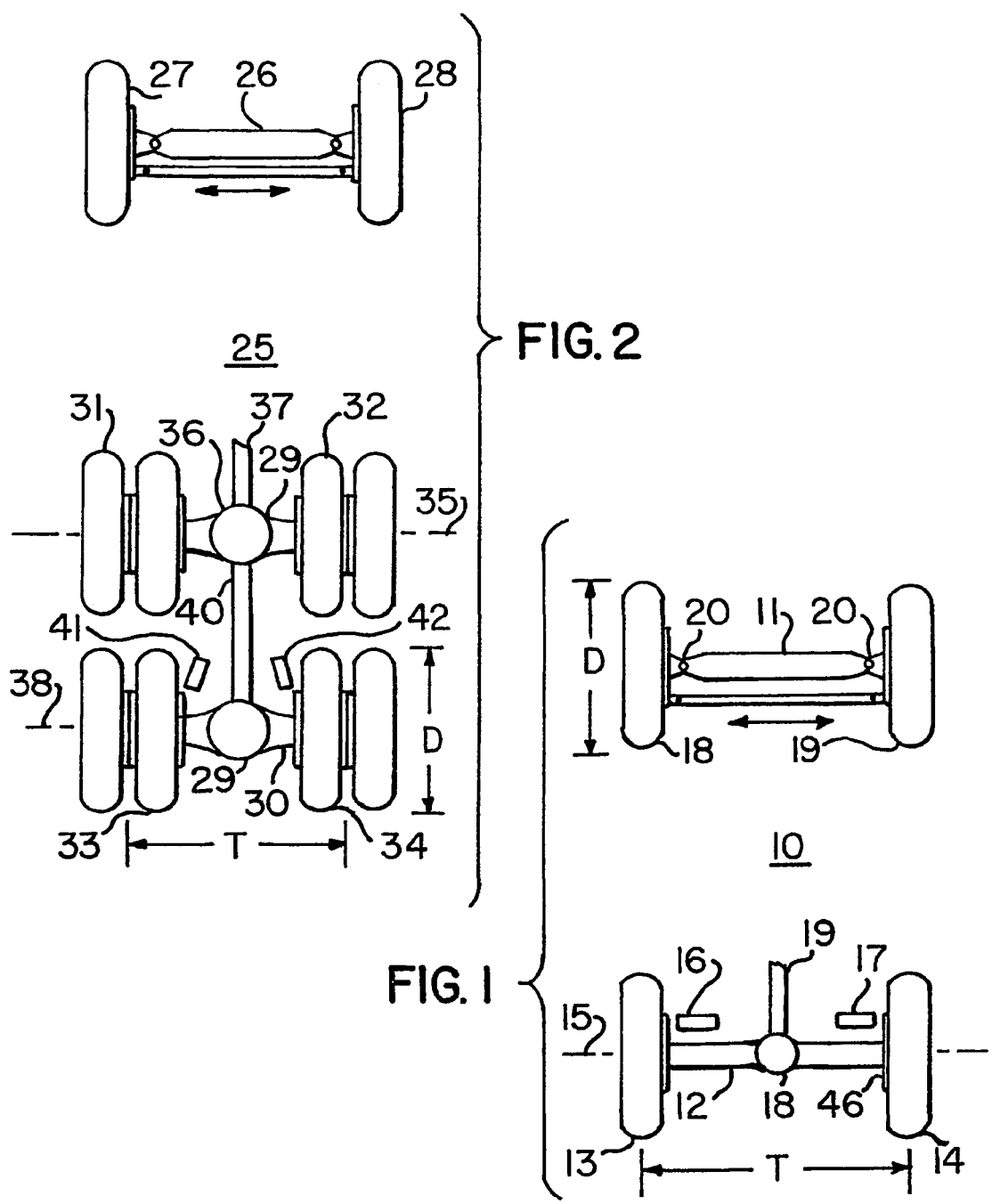

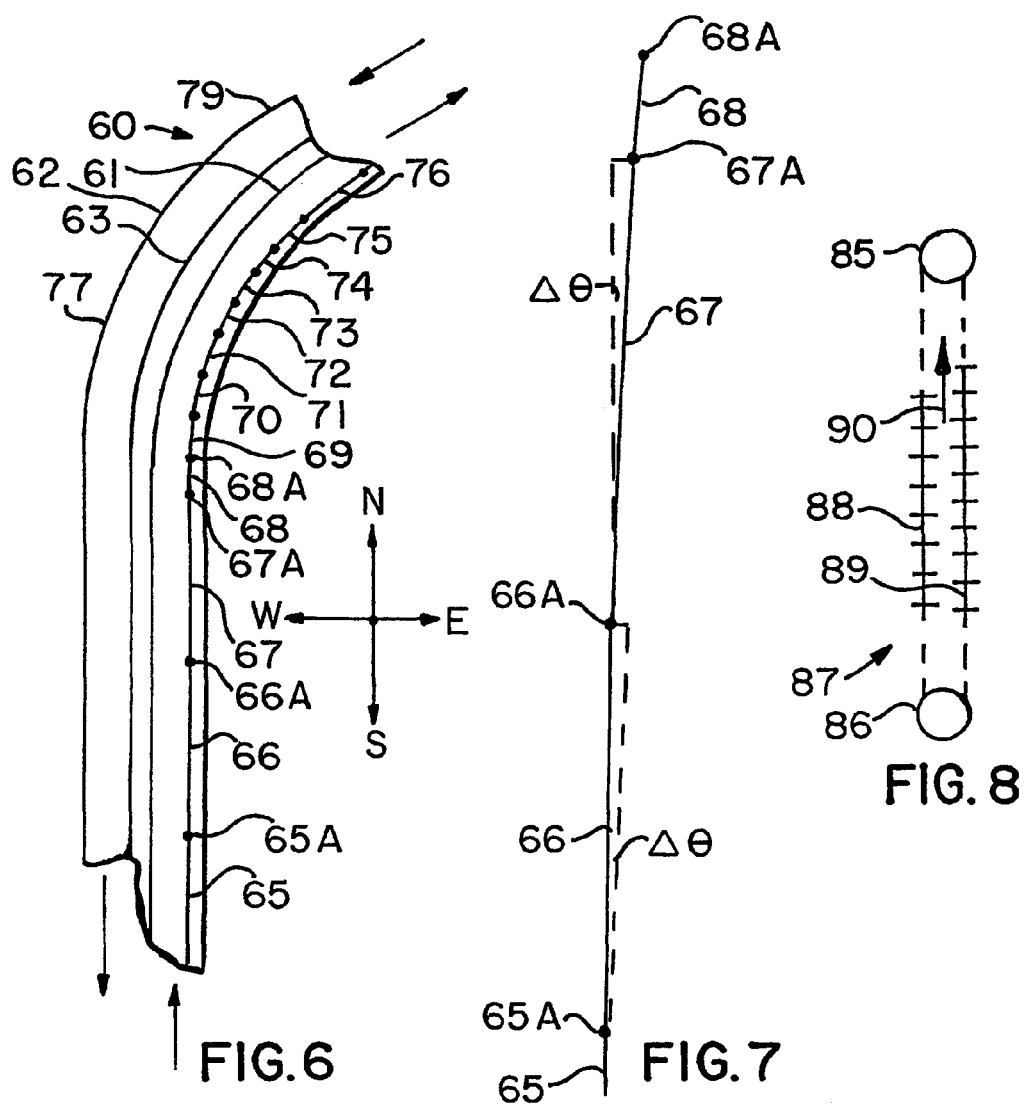

ROUTE DATA BASE GENERATION PROCEDURES AND SYSTEMS, PROCESSES AND PRODUCTS RELATING THERETO

CROSS-REFERENCE TO RELATED APPLICATIONS

This application is a division and claims priority to application Ser. No. 10/415,961, filed on May 6, 2003, now U.S. Pat. No. 7,610,150 and claims priority to International Application No. PCT/US00/30855 filed Nov. 10, 2000.

STATEMENT REGARDING FEDERALLY SPONSORED RESEARCH OR DEVELOPMENT

Not Applicable.

BACKGROUND OF THE INVENTION

1. Technical Field

This invention relates to systems and procedures for generating a data base of a route traversable by a vehicle that may be self-propelled or otherwise moveable over the course of the route. The invention also has to do with the use of such systems and procedures of route data base generation in associated products, systems and other procedures 2. Background Information The global positioning system (GPS) has been especially useful as an aid to air and water navigation and relating thereto has been helpful in developing road maps and other land based travel aids. However, the use of the GPS for tracking land vehicle movements in metropolitan, mountainous, and other land areas is basically unsatisfactory for various reasons. In the metropolitan areas, the high rise structures obstruct or block the GPS signal paths to the street level user. In the mountainous environments, the signals are similarly blocked from reaching the users in the valleys and lower reaches of the mountainous areas that are located between the surrounding summits. In addition, the user is blocked from such signals in tunnels and other subterranean areas and such signals fail to adequately penetrate overhead and road side foliages even at sea level. Such impaired signal reception interferes with the reliability and accuracy of position monitoring systems that may be carried on-board the vehicles whose positions are the subject of the monitoring system.

The GPS not only has severe limitations to its use on overland roadway travel routes, but is unusable in roofed or otherwise shielded area that prevent the satellite signals from penetrating to the covered areas of use, such as those located in warehouses and conventional supermarket shopping areas, to name but a few. Here, in such shielded areas, suitable route data bases can be readily generated in accord with certain aspects of the invention. The developed route information may be adapted for use in controlling the paths traversed by robotically controlled equipment over traversable floor space in roofed facilities. In addition, there is a need in warehouse and supermarket shopping areas for route data base generating systems and procedures that can be efficiently used to map the areas and establish the location of products stored therein. Shopping areas need useable on-the-spot route mapping facilities so as to establish a data base indicative of the product locations in the areas. Such data bases may be used to provide maps for workers and customers including route maps which can be embodied in video displays that may be mounted in floor space areas or on shopping carts and other moveable vehicles for view by the workers and customers so as to thereat serve as visual guides to the stored products in such areas.

Today, computerized navigational systems for aiding vehicle drivers in their efforts to find and traverse suitable routes of travel to both near and far destinations are available on the market. By simply inputting a street address or an intersection of streets in some navigation systems, one can download data for printing a map or get a video display of the involved areas and which bears suitable indicia serving to visibly indicate the location of the address or intersection. Such sitemaps, however, are immobile and not adapted for use on moving vehicles where the only known link to information capable of indicating a then current vehicle location while navigating an overland highway is that of the GPS.

Notably lacking for use by overland vehicle travelers, however, is any suitable way for continually indicating the current location of the vehicle on a video or other visual display of the route being traversed. The GPS is unable to carry out the tasks in many areas of the country and especially in the major cities thereof. The need for a system providing current data indicative of a travelers current vehicle location while traversing metropolitan and mountainous areas, where the GPS signals used in establishing such locations are unavailable to travelers, is obvious.

Yet another system in great need in the overland navigational art is one which can be used by parents and guardians of new drivers who want to monitor their driving efforts and which can be called upon to verify the whereabouts of the driver and his/her driving characteristics on a time/dated basis. Akin to a new driver monitoring system is one which can be imposed upon one with a history of inappropriate driving habits by the court systems. Many of those convicted of driving while under the influence of alcohol or a controlled substance still have on-the-job driving requirements and the need to drive to and from their place of employment. Judges, while quick to impose driving restrictions in such cases, are nevertheless reluctant to impose a complete removal of the driving privileges when the offender is the principal provider for other family members. As a result, the addicted individual, although restricted in movement on paper is nevertheless left in a position which enables him/her to circumvent any driving restrictions with a relatively low probability of discovery unless apprehended again during a violation of the restriction for reasons of the addiction. Consequently a need exists for a suitable way to monitor the routes taken and the driving characteristics of the chronic alcohol and substance abusers who are or should be under a court ordered driving restriction. Apart from the above, the need exists for a system that comes into play and records what happens to a vehicle at the time of its involvement in an accident. If such a system existed, and a so-called "black box" for motorized road vehicle was part of the makeup of such road vehicles, accidents would decrease, insurance rates would decrease and the proof of liability for such accidents in contested legal cases would be greatly simplified.

SUMMARY OF THE INVENTION

It has been determined that reception and use of the GPS satellite signals on-board a ground route traversing vehicle to ascertain it's current location along the route can be avoided or circumvented in establishing a so-called "real time" location of the vehicle. Instead, the current vehicle location can be continually established while traversing the course of the route in a conventional wheeled vehicles by the computer generation of data relevant to the current location of the vehicle on the route being traversed from distance and heading information that is readily obtainable by monitoring and detecting certain movements of selected components of the vehicle. The distance and heading information is continually processed upon receipt by the computer to provide a current vehicle location which may be stored and/or outputted and used in a system for communicating the current vehicle location to the driver or to others who, although remotely located, may also be concerned in the current location of the vehicle. The current location can, of course, be readily communicated to the driver via an on-board audio and/or visual communication system which operates under the control of the computer. On the other hand, an rf, laser or other communication link may also be used to pass the data relevant to the current vehicle location to mobile or fixed locations that are remote thereto.

Most routes in a roadway system will follow a tortuous ground surface course between the starting and end points of the route. However, in compiling a route data base that includes a route definition with distance and azimuth data that is indicative of the route location and its meanderings, large portions of the route can be and have been treated as interconnecting linear paths or route segments which are simply defined in the data base by their displacement in distance and direction from an end point of a preceding segment. In situations where small distances measurements are encountered with relatively large bearing changes between the start and end points for a route segment, there is a tendency to pass over or ignore the contour of the route segment in the map data base and to normalize the data so that the route segment simply fits the start and end points thereof. Such procedures are also sometimes adopted if the route segment data is based on lengthy distance measurements and infrequent bearing determinations. In the preferred practice of certain aspects of the invention, multiple distance measurements and azimuth or heading determinations are made during the traversal of relatively short distances along the route and, which among other things, serve to avoid the need for the normalizing procedures referred to above. The route definition in such cases is basically founded on division of the route into a plurality of short linear segments that are interconnected and arranged in an end-to-end serial order from the starting point for the route to its finishing point.

As one aspect of the current invention, certain improved procedures are advocated for generating distance and heading or azimuth data for route definitions contemplated for embodiment in a map route data base. The procedures result in the embodiment of more accurate route definitions in the data bases that are developed and also facilitate and improve the gathering of the relevant location and orientation information used in defining the courses followed along such routes.

The procedures are especially useful in developing course data definitive of overland routes for on-the-road travel by vehicles. Such procedures, nevertheless, may also be used to develop accurate data bases for routes traversable in off-the-road areas including those areas that are roofed or otherwise shielded from exposure to the GPS satellite signals, such as encountered in warehouses and conventional shopping areas found in the so-called supermarket shopping facilities to name but a few. Here, route information acquired as contemplated herein can be readily adapted for use in controlled transportation systems of a robotic nature and which are concerned with product placements and pick-ups at predetermined locations in such areas. In other cases, the acquired route information can be simply adapted for use in developing fixed or mobile route displays which serve the viewer by identifying the product locations of interest in such areas. In addition, the acquired route information can also be adapted for use in initiating audio and/or visual perceivable messages of an advertising nature at predetermined product locations along the routes traversed in such locations.

As will be seen below, in accord with certain aspects of the invention, use is made of a wheel assembly which is moveable over the course of a route to be defined in a route data base, or to otherwise be identified for establishing a real time location of the vehicle as it traverses the route. The wheel assembly is equipped with suitable means that is responsive to wheel movements for measuring the distance traveled over the route and is provided with a suitable means for generating output signals that may be used in determining information relevant to the location and orientation of the assembly during its course of movement over the route.

The route generating systems and procedures advocated herein may be used to augment conventional navigational systems for land based vehicles and serve, in real time, to continually identify the location of the land based vehicle in reference to the routes being traversed under route directives emanating and/or derived from such conventional systems. The route generating systems and procedures involved are especially useful in route areas that encounter impaired reception of the GPS satellite signals and can serve as an adjunct or supplemental source for determining vehicle location and orientation information which would otherwise be unavailable from the GPS for reasons of signal interference in mountainous and metropolitan areas. Apart from such GPS supplemental aspects, the generating systems and procedures advocated herein may be used to totally avoid the need for using the satellite signals of the GPS in establishing the real time on-road locations for such vehicles as will be evident below.

It will also be evident below, that the route generating procedures advocated herein may be readily embodied in driver monitoring systems that are suitable for recording the driving habits of new drivers, as well as those of individuals who are addicted to alcohol and/or drug usage's. Moreover, the procedures may be utilized in systems that are designed to monitor and record the routes taken by such drivers on a time-dated basis or to otherwise relay such route traversal information to a central location for monitoring and recording. Furthermore, the advocated procedures, as will be seen below, may also be used, without the need for reliance on receipt of signals emanating from satellites of the GPS, for the development and recording of a short or long time history of on-the-road vehicle movements before, during and after the happening of an accident involving the vehicle.

DESCRIPTION OF THE SEVERAL VIEWS OF THE DRAWINGS

FIG. 1 schematically illustrates the front and rear wheel assemblies and associated structure of a conventional 4-wheel self propelled and rear wheel powered vehicle together with certain monitors that are provided for detecting wheel movements and measuring the distances traveled by the wheels.

FIG. 2 schematically illustrates the front and rear wheel assemblies and associated structure of a conventional 10-wheel self propelled vehicle of a "tractor" type, the motor driven wheel assemblies having duo-wheel components and being illustrated as associated with wheel monitors for detecting wheel movements and traveled distances.

FIG. 6 generally illustrates a typical portion of the interstate highway system and shows simulated segments of a route that may be traversed to compile a data base definition of the route.

FIG. 7 generally illustrates procedures involved in measuring segment lengths for determining azimuth changes made by a vehicle while traversing a route segment contemplated for storage in a data base definitive of the route.

FIG. 8 illustrates certain procedures involved in measuring segment lengths and azimuth changes of a vehicle involved in the compilation of location and orientation data for linear segments of the route.

DETAILED DESCRIPTION OF THE INVENTION

Figure 3:
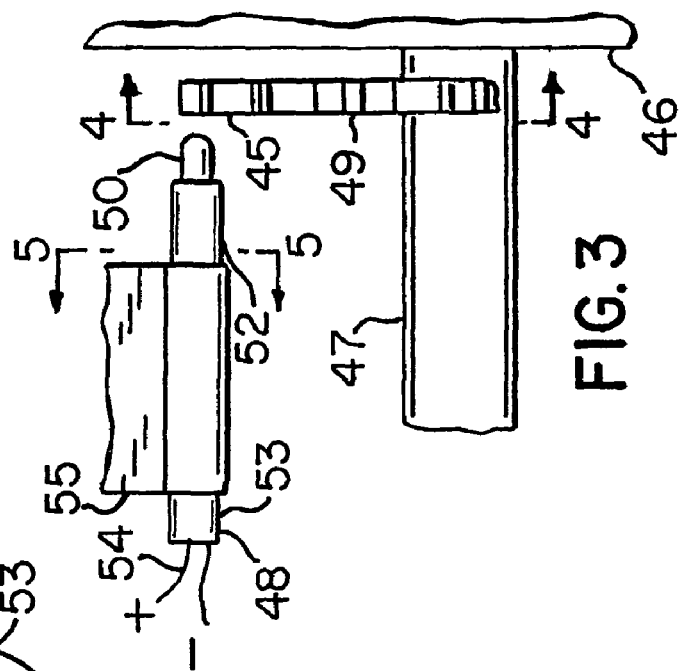
FIG. 3 illustrates the general location of the components of a wheel monitor that is associated with one of the wheels of the rear wheel assembly of the vehicle illustrated in FIG. 1, certain parts of the vehicle and the components of the monitor being broken away.

In accord with the invention, a route data base generating system utilizes a vehicle which is moved over the course of the route and which has one or more components with movements that may be equated to the heading or azimuth of the vehicle and to the distance traveled by the vehicle. The preferred system for use in generating a data base that is definitive of a traversable route includes a computer and an assembly that has at least one pair of wheel components which are laterally spaced apart along and rotatable about a common axis. This assembly is adapted for movement in ground contact over the course of the route during the generation of the data base definitive thereof. The data base generating system also has a system for determining the distance traversed by the respective wheels of the assembly during its movements over a route and for also determining the azimuth or heading of the assembly during its course of movements over the measured distances. As will be seen below, the sources of information for making the azimuth and distance change determinations, in the absence of the GPS satellite signals, is readily available by appropriately and simply measuring the wheel movements of the assembly as it traverses the route under investigation.

In some instances, the wheel assembly may be simply moved by human efforts and either pushed or pulled over the course of the route being traversed. Such arrangements would normally be found most useful in generating data base information for short routes, such as those that would be encountered in many so-called "roofed areas" where the GPS signals are unavailable for use. In other instances, the assembly may be moved over the course of the route as a component of a self propelled vehicle or, alternatively, another vehicle which is trailed or otherwise connected thereto. Such arrangements would normally be found most useful in so-called "on-the-road" environments although some self propelled systems would obviously also be useful in the "roofed areas".

As for the wheel components which are paired for rotation about a common axis, it will be seen that the wheels preferable have the same diameter and that each wheel is provided with a system or device for monitoring its rotational movements and generating a digital output which is indicative of the distance traveled by the wheel during its movements over the course of the route. In practice, a variable reluctance sensing system is preferably used for monitoring the wheel movements and for providing the digital output signals. However, other sensing systems may be used for such purposes, such as light systems where between the light source and its sensor, a beam of light is interrupted between succeeding measured increments of movements of the wheel.

The distance measuring system may in some cases simply involve an odometer or other tap involved in conventional automotive distance measurements. Preferably, however, the distance measuring system and the azimuth monitoring system are cooperatively integrated so that the components involved in determining the azimuth or bearing information delivered to the computer are also involved in the monitoring and detection of the distance information fed thereto and processed thereby as will be seen below.

The computing system may be moved over the course of a route with the wheel assembly during its traversal of the route as the data base is being generated. Alternatively, the computer system may be located apart from and remote to the wheel assembly during its traversal of the course of the route. In this alternative situation, a suitable transmission system may be carried on or with the wheeled assembly for purposes of establishing an r-f, infra red or other communication link between the on-board sensors and a remotely located computer facility.

It can be shown that the variations in the azimuth and heading of a conventional 4-wheel automotive vehicle, during its course of movement over a route being traversed, are related to the difference in distances traveled by those wheel components at the opposite sides of the vehicle and which rotate at all times about a common axis. For example, the two wheels at the rear of the conventional 4-wheeled automotive vehicle rotate at all times about a common axis. A movement of such a vehicle from a starting location and heading, through a 360° change in azimuth, to a final location and heading which is the same as that at the start of the movement will result in a difference in the distances traveled by the rear wheels which is equatable to and indicative of a 360° change in the azimuth or heading of the vehicle. In addition, a comparison of the distance movements of the wheels at the completion of the 360° azimuth change will reveal and is indicative of whether the azimuth change occurred during an overall clockwise or counterclockwise movement of the vehicle between its starting and final locations. Apart from the overall movement, a comparison of the distance movements of the wheels during the 360° maneuver may reveal that both clockwise and counterclockwise directional movements or azimuth changes occurred as succeeding segments of the route were traversed during the maneuver. As will be seen below, as long as the wheels of the assembly have the same circumference throughout the 360° maneuver, the distance differences are dependent only upon the track followed during the co-axial movements of the wheels.

For example, with reference to a two-wheel assembly in which the two wheels are spaced apart and rotatable about a common horizontal axis, it can be shown (See: Equation (1) below) during a general clockwise movement of the wheel assembly through a 360° azimuth change that:

$$\Delta d = d_L - d_R \text{ (ins.)} \quad (1)$$

where:

$\Delta d$=the difference in distances traveled by the left and right wheels of the assembly while traversing the route involved in the 360° azimuth change. (ins.), $d_L$=the distance traveled by the left wheel of the assembly during the movement of the assembly over the course of the route involved in the 360° azimuth change. (ins.), and $d_R$=the distance traveled by the right wheel of the assembly during the movement of the assembly over the course of the route involved in the 360° azimuth change. (ins.).

The ($\Delta d$) value for a 360° azimuth excursion by the wheel assembly can be predicted without prior knowledge of the wheel diameters by simply considering the distance traversed by one wheel of the assembly if rotated 360° about a vertical axis through the other wheel and by also considering the track width (T) of the two-wheel arrangement in the assembly as equivalent to the radius (R) of the circle subscribed during the 360° movement. Such considerations can be justified under such circumstances because the one wheel at the axis of rotation would have no forward or rearward movement and the circumference of the circle (C) traversed by the other wheel can be equated to the 360° change in the azimuth.

Equation (2) can accordingly be used to equate differences in the measured distances that are traveled by the wheels of a two-wheel component assembly to the changes in azimuth or heading of the assembly during its traversal of all or any fraction of a route course being investigated.

$$\Delta d = C = 2\pi T = 6.2832 T \text{ (ins.)} \quad (2)$$

where:

$\Delta d$=the difference in distances traveled by the left and right wheels of the assembly while traversing the route involved in the 360° azimuth change. (ins.), C=the circumference of the circle subscribed by the one wheel of a 2-wheel assembly if the assembly is rotated for a 360° azimuth change about a vertical axis that is located in that plane of symmetry of the other wheel which is normal to the horizontal axis of rotation for the assembly wheels. (ins.), and T=the track width for the arrangement of the wheels at the opposite sides of the assembly and as measured in a 2-wheel assembly between those vertical planes of symmetry for the respective wheels that are normal to the horizontal axis of rotation therefor. (ins.).

Equation (3) simply illustrates a use of the difference in distance traversed by the wheels during a 360° excursion of the wheel assembly to ascertain that distance difference which would be associated with a 1° azimuth change.

$$\Delta d_1 = C/360 = \Delta d/360 \text{ (ins.)} \quad (3)$$

where:

$\Delta d_1$=the difference in distances traveled by the respective wheels of the 2-wheel assembly and which is equatable to a one degree (1°) change in the azimuth of the assembly. (ins.), $\Delta d$=the difference in distances traveled by the left and right wheels of the assembly while traversing the route involved in the 360° azimuth change. (ins.), and C=the circumference of the circle subscribed by the one wheel of a 2-wheel assembly if the assembly is rotated for a 360° azimuth change about a vertical axis that is located in that plane of symmetry of the other wheel which is normal to the horizontal axis of rotation for the assembly wheels. (ins.).

The comments above revolve around an overall clockwise or counterclockwise movement of a 2-wheel assembly during its traversal of the route involved in the 360° azimuth change.

One other comment is also appropriate at this point and it relates to situations where the wheel assembly involved in the computations is a 4-wheel component assembly with two pairs of duo-wheels that are rotatable about a common axis and respectively located at opposites sides of a vehicle embodying the assembly. Such is found in a conventional 10-wheel tractor that is adapted to haul a semi-trailer in an arrangement commonly referred to as an "18-wheeler". Such 10-wheel tractors usually have two driven duo-wheel assemblies that are located in a tandem arrangement at the rear of the tractor. Distance information from either of such duo-wheel assemblies may be used as a basis for the calculations contemplated herein. First of all, each wheel assembly has a pair of normally driven duo-wheel components that are respectively located at the opposite sides of the tractor. Under such circumstances, only one sensor is needed to sense the movements of a duo-wheel component at each side of the vehicle. Secondly, the track width T in the tractor arrangement involved in the calculations is then measured along the axis of rotation for the wheels of the assembly and extends between the planes of symmetry for the respective duo-wheel arrangements at the opposite sides of the tractor and which are normal to the axis of rotation for the wheels thereat. This will be evident in the subsequent consideration of FIG. 2.

At this point, it is apparent from the above that a source of information for determining the azimuth or heading of a vehicle involved in developing a route data base is readily available in the vehicle per se and that reliance on the receptions of signals emanating from the GPS satellite system is unnecessary. Further consideration of azimuth matters will be evident from disclosure below.

The distance determinations for the conventional 4-wheel automotive vehicle may be arrived at in conventional ways such as by an odometer tap. However, in the preferred practice of the invention, the distance traveled by the vehicle is arrived at by a consideration of the distances traveled by at least those wheels involved in the azimuth determinations. As will be seen, in practice the distances traveled by the wheel components involved in the azimuth determinations are determined incrementally and the distance of incremental wheel component movement are preferably established as less than the shortest linear segments which would be developed, during the sharpest turns encountered during movements of the wheel assembly and also less than the predetermined threshold distance involved in establishing the segment lengths and azimuth changes between linear segments as will be discussed below.

Reference is now made to FIG. 1 and which schematically illustrates the front and rear wheel assemblies 11 and 12 of a conventional 4-wheel self propelled vehicle 10 that may be commonly encountered on todays interstate highway system. Although each wheel of the front and rear wheel assemblies 11 and 12 of the vehicle 10 normally has the same diameter (D) as the other wheels of the vehicle, only those wheel components 13 and 14 of the rear wheel assembly 12 are preferably involved in the measurement procedures that are determinative of the route segments lengths and heading changes in the computing procedures illustrated below. The tract width (T) for the left and right wheels 13 and 14 of the rear assembly 12, as shown in FIG. 1, is measured between the planes of symmetry for the respective wheel components 13 and 14 which are normal to the common axis 15 of revolution therefor.

Each of the rear wheel components 13 and 14 of the vehicle 10 is associated with a respective monitoring system 16 and 17 that generates an output signal which is indicative of a predetermined distance of travel by the wheel component as it revolves during traversal of a route. The particulars of the monitoring systems used in sensing and measuring movement of these wheels of the rear wheel assembly 12 will be considered below. It is believed evident that the rear wheel assembly 12 in FIG. 1 is one where the wheel components 13 and 14 are driven through a differential 18 that is, in turn, driven via a drive shaft 19 connection with the motor transmission of the vehicle 10. In the front wheel assembly 11, on the other hand, the individual wheel components 18 and 19 are involved in steering the vehicle 10 and accordingly pivot about respective vertical pivot axes, collectively designated at 20. As will be evident subsequently, the arrangement in FIG. 1 may be used for generating a route data base that is subsequently used in developing maps etc. and/or may be also used in generating information which is indicative of the current location the vehicle and useful for visual display identification of the vehicle location along traversable routes or relative to objects having fixed locations, such as product storage facilities in supermarkets etc.

Reference is now made to FIG. 2 and where the vehicle illustrated is depicted as a tractor 25 of the 10-wheel type and which is normally used for hauling trailers through a fifth wheel pivotal connection. It has a front wheel steering assembly 26 that includes left and right wheel components 27 and 28 and which are pivotally moveable in parallel about vertical axes, collectively designated at 29. The tractor 25 has front and rear motor driven wheel assemblies 29 and 30 at the rear of the vehicle and each assembly has a pair of duo-wheel components at the left and right sides of the vehicle. which rotate in unison. The left and right duo-wheel components of the motor driven front assembly 29 are designated at 31 and 32 respectively. Those of the motor driven rear wheel assembly 30 are designated at 33 and 34. The duo-wheel components 31 and 32 of the motor driven front wheel assembly 29 are rotatably driven about a common axis 35 through a differential connection 36 with a drive shaft 37 driven by the motor of the tractor 25. The duo-wheel components 33 and 34 of the motor driven rear wheel assembly 30 are rotatably driven about a common axis 38 through a differential connection 39 with a drive shaft 40 which is driven through a drive connection at the differential 36.

In the preferred arrangement for determining differences in distances traveled by wheel components of the duo-wheel types, the wheel components 33 and 34 of the rearmost powered wheel assembly 30 are associated and equipped with respective output signal generating monitoring systems as designated at 41 and 42. It should be pointed out, however, that similar results may be obtained through use of such monitoring systems in conjunction with the wheel components of the front motor driven wheel assembly 29.

Figure 5:
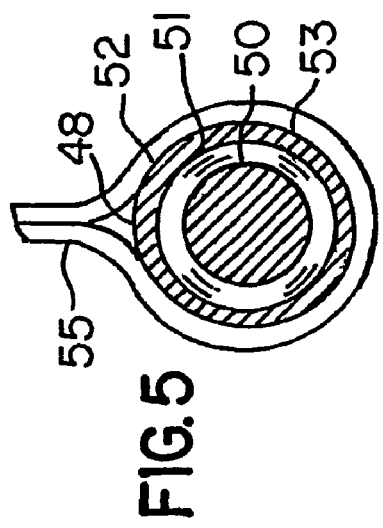
FIG. 5 is an enlarged vertical section along the lines 5-5 of FIG. 3 and through a wheel sensor involved in detecting distance traveled by one of the rear wheels of the vehicle shown in FIG. 1.
Figure 4:
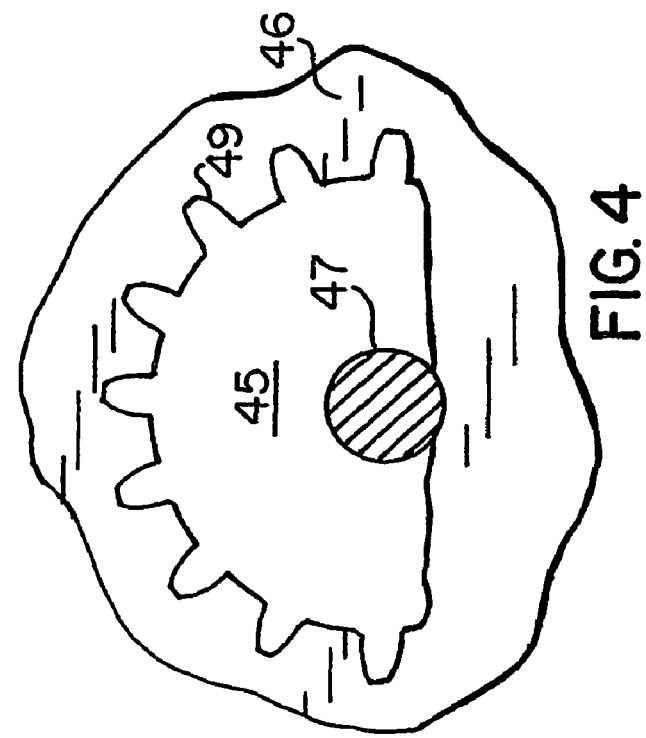
FIG. 4 is a vertical section taken generally along the lines 44 in FIG. 3 and shows a spur gear which rotates with the drive axle for the wheel being monitored by the monitor system contemplated in FIG. 3, certain parts being broken away.

The components of the monitoring systems are best illustrated in FIGS. 3-5 and which is illustrative of the monitor system 17 used for the right rear wheel 14 of the vehicle 10 shown in FIG. 1. This wheel 14 revolves, at all times during use, about an axis 15 that is common to the rotary movements of the left rear driven wheel 13 of the vehicle 10. It will be evident subsequently that the computations of the azimuth changes of the vehicle 10 being based on the difference in distance movements of the vehicle wheels 13 and 14 over a course of travel are simplified if the wheels involved in the distance determinations have a common axis of rotation at all times. In contrast to this, since the wheels of the front wheel assembly 11 are steerable and only rotate about a common axis when the vehicle is traversing a linear path, compensating computations to correct for the off-axis periods of wheel movements must enter into the picture for determining azimuth changes among others. As such, computations are simplified if the wheels involved in the distance measurements are rotatable about a common horizontal axis at all times and also have a track (T) which is also constant at all times during measurements.

The monitor system 17 depicted in FIGS. 3-5 includes a spur gear 45 which, in the illustration, is mounted in close proximity to the brake housing 46 for the wheel 14 movements being monitored. The gear 45 is made of suitable magnetic material, such as steel, and is suitably keyed for rotation on a 1:1 basis to the wheel axle 47 that is connected to and serves to provide the drive connection between the differential 18 and rear wheel 14 associated with the monitor 17. The wheel 14 and associated gear 45 are rotatably driven through the differential 18 connection with the drive shaft 19 of the vehicle 10 and a similar arrangement is involved in the drive connection with the left rear wheel 13 that is involved in the computations.

The monitor 17 also has a variable reluctance sensor 48 which is so mounted and arranged relative to the gear 45 as to sense the movements of the gear teeth 49 by detecting the interruption in a magnetic field which is developed by the sensor component 48 as each tooth passes in front of the sensor core piece 50 during the rotation of the gear 45 about the common axis 15 involved in the rotation of the wheel components 13 and 14. The core piece 50 is elongated and made of magnetic material, such as steel. It is surrounded, along its axis, by suitable windings 51 which may be embedded in suitable plastic material in the space between the core piece 50 and an outer steel wall 52 of a hollow cylindrical housing 53 for the sensor components. The windings 51 are connected in a D-C circuit 54 which experiences a detectable pulse when each gear tooth interrupts the magnetic field during the rotation of the gear 45 and wheel 14 about the common axis 15 for the rotary movements of the wheels. This provides an output sensor signal from the sensor circuit 54 and which is delivered to the computer for processing as indicated hereinafter. The sensor 48 is connected by a bracket 55 to suitable structure of the vehicle which maintains a fixed operating relationship between the sensor 48 and gear teeth at all times during the monitoring process. Here, at the rear of the vehicle 10, the sensor may be suspended from the housing (not shown) for the axle 20 or otherwise suitably fixed for example to the brake housing 25.

It may be mentioned at this point that the movements of the rear wheels in assembly 12 are being monitored to provided distance data to a computer for purposes of computing traveled distances, azimuth changes and coordinate locations of the vehicle. Such data and information may be used in the computation of current vehicle location and/or stored for use in a revised or new data base that is definitive of the route then being traversed. The delivery of such current vehicle location and movement data to a system for visually displaying the current vehicle locations and movements relative to a visible graphic display of the route being traversed is one of several objectives of the invention.

As previously indicated, routes in a roadway system usually follow a tortuous ground surface course between the starting and end points of the route. In compiling a route data base that includes a route definition with distance and azimuth data that are indicative of the route location and its meanderings, all portions of the route can be treated as route segments of a linear nature and which are interconnected in a serial order from the commencement to the end of the route. This is the approach taken in accord with various aspects of the invention and the linear paths or route segments are simply defined during the compilation of data relevant to their location and orientation by their displacement in distance and direction from the end point of the previous route segment encountered and defined during the compilation procedure.

As illustrated above, the difference in distance traveled by the wheels of a 2-wheel assembly having a known track (T) and wheel diameter (D) can be equated to a change in azimuth by the assembly. (See: equations 1-3.) If the difference in distances traveled by the wheels of the assembly can be measured with sufficient precision to provide detectable small changes in the assembly heading between connecting segments in the serial order, and if the lengths of the shortest segments encountered in the compilation of the data for the serial order can be determined with comparable accuracy, one can accurately describe a route as a series of interconnecting linear segments with varying lengths and in which the angular deviation in heading between connecting segments in the series is the same even though differing in direction. The angular deviations may vary in either a clockwise or counter clockwise direction under such circumstances but the ability to establish the change in heading for all linear segments in the serial order simplifies the structure and arrangement of the stored data.

In accord with the preferred procedures for compiling the data relevant to a route segment length and its orientation in the serial order of the linear segments involved in the definition of the route, an average of the distances traveled by the wheels during traversal of the segment is being made and the difference in distances traveled by the wheels while traversing a segment is being compared against a predetermined distance that serves as a constant threshold value in the comparison. The predetermined threshold distance serves to establish the angular deviation of the heading of the segment being traversed to that of the segment last defined in the serial order upon the occurrence of a match between the distance difference and the threshold value. Substantially simultaneously, when the threshold match is made, the computation involving the segment length determination is terminated so that the length of the segment as well as the heading deviation are established substantially simultaneously. The preferred computing procedures are such that the coordinates for the contemplated end point of the segment being traversed are also being continually computed as the length and heading changes are being determined. The termination of the length and heading change computations also serves to terminate the coordinate computation and the relevant data for the traversed segment is then stored and the computations turn to the next segment being traversed in the order.

The incremental distances involved in the distance measurements made by the wheels control the accuracy of the azimuth and length determinations in the preferred arrangement contemplated herein. With this in mind, the distance represented by the predetermined threshold value that establishes the angular heading deviation for a segment, the length of the segment, and the coordinate location of the end point of the segment should substantially exceed the incremental distance of measurement used in determining the distances traveled by the wheels in computing both the segment length and resulting azimuth. Furthermore, in the computations contemplated herein for determining segment lengths and the azimuth changes therebetween, by minimizing the incremental distance measurements that are taken for computing the distance measurement involved in the computations, and by also diminishing the predetermined tolerable threshold distance difference used for establishing the azimuth change between contiguous route segments without, however, falling below the minimized distance measurement interval, one can approach a true mathematical integration of the contour of the route.

The operation of the data base generation system is best understood by an illustration of a method for measuring and computing the route segment lengths and for establishing the headings or vehicle azimuths of the segments as the data base for the route is being compiled during movement of an appropriately equipped vehicle with suitable means for incrementally measuring the distances traveled by the rear wheels over the course of the segment lengths.

Reference is now made to FIG. 6 and which graphically illustrates the structural arrangement for compiling and defining a route along a typical portion of an interstate highway system 60 where there is a two lane roadway 61 in one direction and which is separated from a two lane roadway 62 in the opposite direction by a medium strip 63. Various segments involved in the generation a definitive data base for the route being traversed are schematically illustrates in the outside lane 64 of the generally north bound roadway 61. The linear segments shown in FIG. 6 are identified, as sequentially forming the subject matter of locational data entered in the computer data base, at 65 through 76. It will be evident that segments 68 thru 75 tend to have an approximately equal length as the uniformly curved portion 77 of the highway is encountered and traversed in lane 64 whereas the segments 66 and 67 have a greater length in the generally due north linear portion 78 of the highway. As one leaves the curved portion 77 and enters a generally north easterly directed highway portion 79 in lane 64, it will be seen that the segment length 76 lengthens by comparison to those segments 68-75, along the uniformly curved portion 77 of the highway.

FIG. 6 illustrates the serial order of the linear segments and their end-to-end connecting arrangement in the order. Whereas the length and heading change of each linear segment are dependent upon increment measurements made while the segment is being traversed, the coordinates for the terminal end of the segment depend upon the calculated length and azimuth changes determined upon reaching the end point of the segment. The end points for the linear segments designated at 65 thru 68 inclusive are designated respectively at 65*a*, 66*a*, 67*a* and 68*a* in FIG. 6 and where it should be evident that the computed segment endpoint automatically becomes the starting point for the next segment traversed in the serial order of segment evaluation.

FIG. 7 further illustrates the segment data determination and compiling procedures. Assuming a data base is being compiled for the route illustrated by the linear segments in the serial order shown in FIG. 6 and with the aid of a vehicle that is appropriately equipped to provide detectable output signals from each of a pair of wheels that are rotatable about a common horizontal axis, each of the output signals being indicative of a predetermined increment of travel along the route. Further assume that the computations of the relevant location and orientation of data entered in the data base for segment 65 ended with the computation of the coordinates for the end point designated at 65*a*. The endpoint 65*a* then becomes the starting point for computing the relevant data to be added to the data base as indicative of the location and orientation of segment 66.

With the above in mind, the distance the vehicle travels from the segment starting point 65*a* toward its termination point 66*a* is preferably continually measured and totaled incrementally for each wheel and by a continual averaging procedure delivered as an output which is equatable to the then current length of the segment. Simultaneously, with the commencement of the length computation for the segment 66, the drift or deviation in movement of the vehicle from the projected heading of segment 65 is monitored. As will be seen below, this is accomplished as the vehicle traverses the segment 66 by monitoring the differences in distances traveled by the wheels of the vehicle and by continually comparing the current drift or deviation to a predetermined threshold distance value which, upon the occurrence of a match between the drift and threshold values, terminates the length and heading change computations for the segment 66 and provides for the forwarding to the data base storage facility of the data relevant to the heading change and length of the segment. Throughout the heading change and length computation procedures for segment 66, the coordinates of an endpoint based on the then current length and drift computations are continually computed. Once the occurrence of the match is detected, the computations of the coordinates are terminated and the then currently computed coordinates for the end point 66*a* are delivered to and stored in the data base compilation facility.

The angular deviation or drift from the projected heading 80 of segment 65 was in a counterclockwise direction as indicated by the offset of the end point 66*a* from the projection 80 in FIG. 7. The direction of the drift in azimuth is picked up in the computing processes and simply indicates that the right wheel distance travel during the change in distance calculation exceeded that of the left wheel. A same procedure is followed in computing the relevant data for the location and orientation of linear segment 67. However, in this instance the distance traveled by the left wheel exceeded that of the right wheel, thus accounting for a clockwise deviation or drift in the heading for the segment 67 from that of the projection 81 from the referencing segment 66. Again the drift or deviation in heading is controlled in the procedure by the predetermined threshold value used in establishing the angular deviation between connecting segments.

FIG. 8 simply schematically depicts outputs from the sensors associated with two wheel components of a vehicle involved in an incremental measurement procedures calling for their movement between the opposite end points of a lineal course designated at 87. Here the opposite end points of the lineal course 87 are indicated at 85 and 86, and the paths traversed by the left and right wheel components between the opposite end points 85 and 86 are depicted at 88 and 89 respectively. The outputs from the wheel sensors are represented by crosslines arrange transversal to the wheel paths 88 and 89. Assuming the direction of travel over the course 87 to be in the direction of arrow 90 and further assuming that the outputs of the wheel sensors were in sync at the commencement of the course traversal undertaking at starting point 86, it can be seen that the outputs along the path 89 of the right wheel are more numerous than those along the path 88 for the left wheel. This would simply indicate that a general counterclockwise drift in the heading of the vehicle is occurring during the course traversal and which can be determined by computations previously considered herein.

FIGS. 9-13 generally illustrate a computer system 95 for generating a data base for a route being traversed by the vehicle 10 of FIG. 1 and wherein the output signals from the sensors 16 and 17 are transforming into data relevant to the location and orientation of a plurality of linear segments that are arranged in an end-to-end serial order in the route definition, the segments being successively traversed by the vehicle 10 and defined for entry in the data base at the time of their traversal. The generating system illustrated contemplates a compilation and storage of the route defining data in a computer storage facility, as it is generated, and from which the data base can be downloaded and recovered for subsequent uses.

Figure 9:
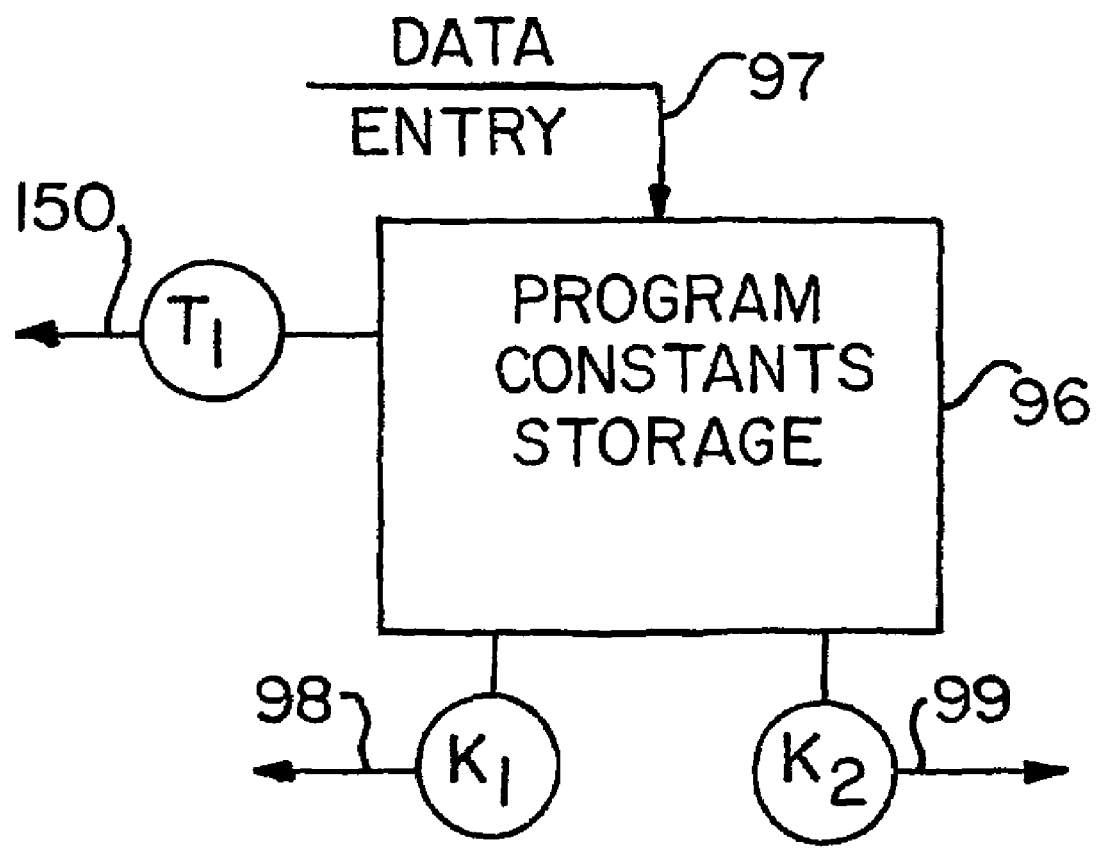
FIG. 9 schematically illustrates a data storage facility for program constants for a computer system involved in computations contemplated by procedures illustrated in FIGS. 9-13.

Turning now to FIG. 9 which schematically illustrates the computer storage facility 96 for receiving data indicative of mathematical constants involved in the computer computations. $K_1$ is a constant involved in the incremental measurement of the distances traveled by the wheels involved in the computations. It has reference, upon the occurrence of the pulse output signal from a sensor, to the increment of distance that has been traveled by the wheel associated with the sensor during the interval of time since the generation of the last pulse generated by the sensor. Equation (4) is indicative of the calculations involved in arriving at the value of the $K_1$ constant.

$$K_1 = W_C/P_R = (\pi)(W_D)/T_G (\text{ins.}) \quad (4)$$

where:

$K_1$=the increment of distance traveled during the time interval between pulses (ins.), $W_C$=the circumference of each wheel involved in measuring the distances incrementally (ins.), $P_R$=the number of pulses emanating from a wheel sensor during one revolution of its associated wheel, $W_D$=the diameter of each wheel involved in the incremental distance computation. (ins.), $T_G$=the number of teeth on each gear associated with the wheels being monitored by a sensor, and $\pi$=3.1416.

$K_2$ is the difference in distance traveled by the two wheels involved in the computations in order to effectuate a 1° change in the azimuth of the vehicle and equation (5) is indicative of the calculation involved in arriving at the value of the $K_2$ constant:

$$K_2 = (2)(\pi)(T)/(360) \quad (5)$$

where:

$K_2$=the difference in distance traveled by the wheels to effectuate a 1° change in the azimuth of the vehicle (ins.), T=the track for the wheels of the assembly involved in the computation and as measured between those vertical planes of symmetry for the respective wheels that are normal to the horizontal axis of rotation therefor. (ins.), and $\pi$=3.1416.

As seen in FIG. 9, the values of $K_1$ and $K_2$ may be stored in the storage facility 96 by introduction thereto via input line 97 during the calibration of the computer program to fit the structure of the wheels involved in the generation of the input pulse signals. Upon appropriate addressing of the contents of the storage facility 96, the values for $K_1$ and/or $K_2$ may be extracted from the storage facility 96 and passed via respective lines 98 and 99 to the appropriate point(s) of use in the computation procedures contemplated below.

Also entered via line 97 and stored in the program storage facility 96 is the predetermined threshold value ($T_1$) which, as will be seen, is determinative of the deviation in the azimuth of each segment of the route data base from that of the segment connected thereto and theretofore defined by appropriate data entries into the data base storage facility 96. As will be subsequently seen, this threshold value ($T_1$) is used in the computation procedure to establish the data for the length, azimuth, and terminal end point coordinates of each segment of the route definition prior to the data entries in the storage facility 96 which are relevant to the location and orientation of the segment in the data base for the route. Upon program demand, the predetermined threshold constant (T1) is forwarded to the appropriate point in the computer system 95 via line 100.

Figure 10:
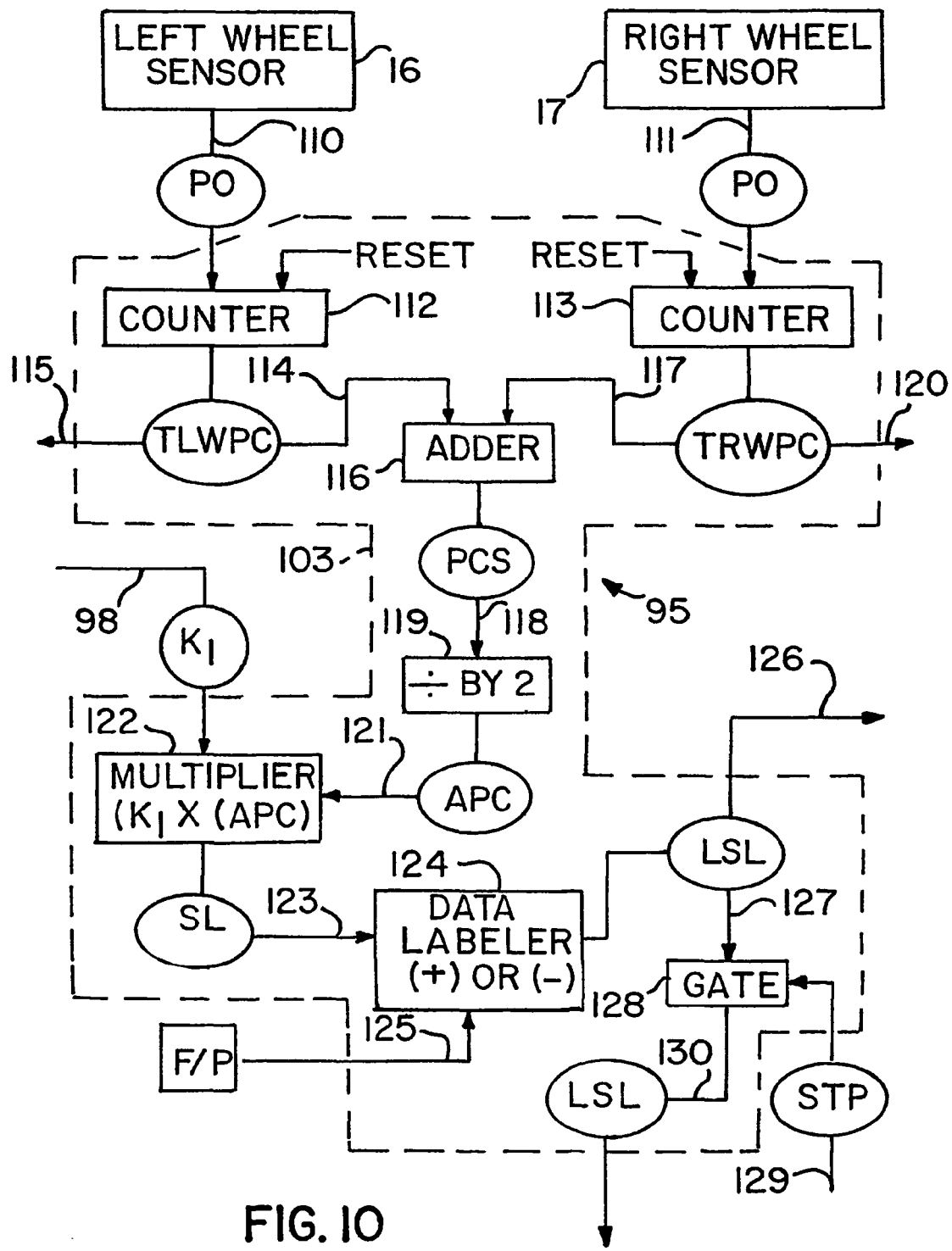
FIG. 10 schematically illustrates a computer route segment length computation system.
Figure 11:
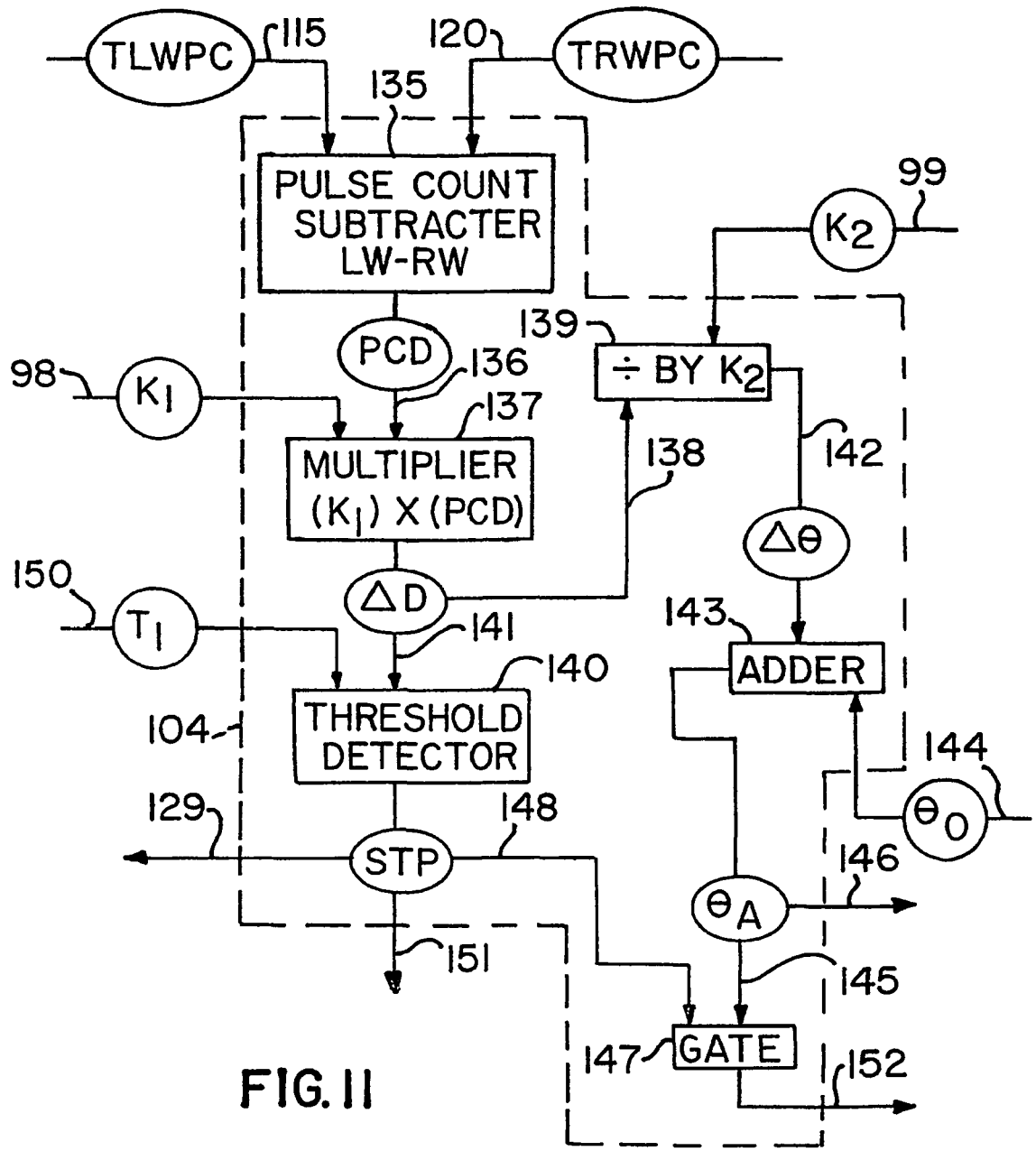
FIG. 11 schematically illustrates a computer route segment azimuth computation system.
Figure 12:
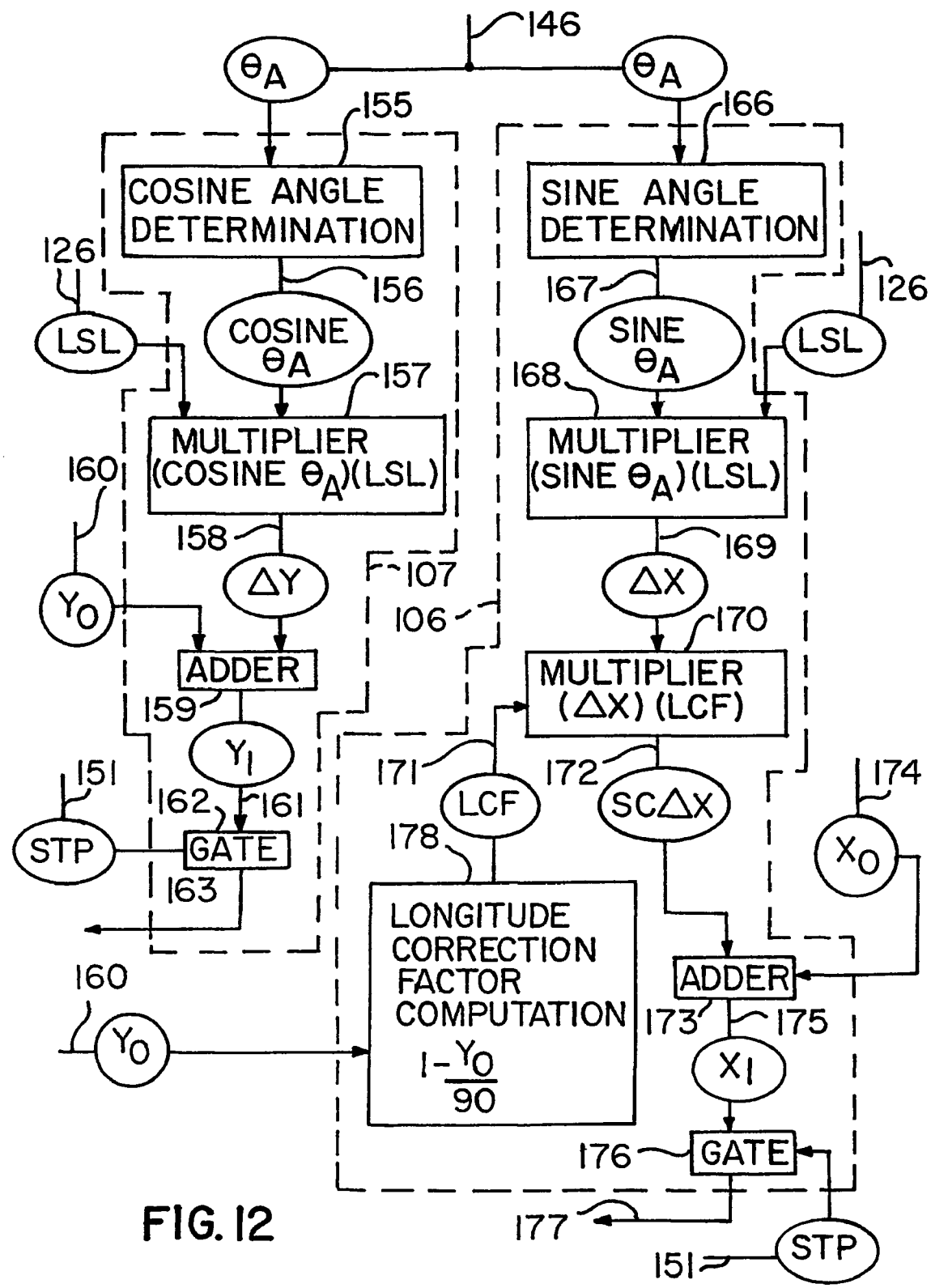
FIG. 12 schematically illustrates a computer route segment end point coordinates generation system.

The process of computing the data relevant to the location and orientation of the segments in the route definition basically involves the generation of data which establishes the length of each segment, the change in its azimuth from that of the last segment forming the subject matter of a data entry in the data base, and the coordinates at the terminal end point of the linear segment. The length generation system 103 of the computer system 95 is shown in FIG. 10, the azimuth generation system 104 is shown in FIG. 11 and the terminal end point coordinates generating system is shown in FIG. 12. System 105, as will be seen, includes a longitude coordinate generation system 106 and a latitude coordinate generation system 107.

The computation procedures in the preferred data base generation embodiment generally contemplate delivery of the pulse output signals of the sensors associated with the respective wheels involved in the computations to respective counters of a data generation system 103 that is primarily directed at determining the length of each segments as it its traversed.

In system 103 the pulse signals from the respective sensors are totaled during the course of movement of the vehicle 10 over the segment length and the current totals are continuously forwarded to the azimuth change generating system 104 for use in computing the change in azimuth between connecting segments. By an averaging procedure the totals are used in system 103 to continually generate an output which is indicative of the currently computed length measurement of the segment and as the segment is being traversed. This segment length output is continually delivered to the end point coordinate computation system 105 for use in computing the current segment end point coordinates which are consistent with the then current segment length and azimuth information being delivered thereto. In the azimuth computation system 104, the difference in distances traveled by the wheels is continually being computed and compared in a comparative process that is aimed at detecting an azimuth change between connecting segments which matches a predetermined azimuth threshold deviation limit between connecting segments. When the computed azimuth change matches the predetermined threshold value, the segment length and end point coordinates computation procedures are terminated. This establishes the appropriate definitions for the segment and which are then delivered to the route data base storage facility.

Turning now to FIG. 10 and which is primarily concerned with the system 103 for computing the segment lengths as the segments are traversed by the vehicle 10 along the course of the route. Sensor 16 is associated with the left rear wheel 13 of vehicle 10 (See: FIG. 1) and the pulse output (PO) from this sensor 16 is continually delivered via line 110 to a counting component 112 of system 103. The counter 112 is reset at the start of the vehicle traversal of each segment, as indicated hereinafter, and continually provides an output of the then current total left wheel pulse count (TLWPC) that has been received at the counter 112 during the course of the segment traversal by the vehicle. This total left wheel pulse count (TLWPC) output is continually delivered via line 114 to an adder 116 of system 103 and via line 115 to a pulse count subtractor of the azimuth change generating system 104. As for sensor 17, it is associated with the left rear wheel 14 of vehicle 10 and the pulse output (PO) from this sensor 17 is continually delivered via line 111 to another counter 113 of system 103. This counter 113 is also reset at the start of the traversal of each segment and continually provides an output of the then current total right wheel pulse count (TRWPC) that has been received at the counter 113 during the course of the segment traversal by the vehicle 10. This total right wheel pulse count (TRWPC) output is continually delivered via line 117 to the adder 116 and via line 120 to a pulse count subtractor of the system 104.

The counter outputs delivered to the adder 116 are continually added together to continuously provide a pulse count sum (PCS) as an adder output which is continually fed via line 118 to a divider designated at 119. Here at the divider 119, the pulse count sum (PCS) is divided by 2 to provide an average pulse count (APC), as the output of the divider, and which is delivered via line 121 to a multiplier, designated at 122. Also impressed upon an input terminal to the multiplier 122 is the $K_1$ constant indicative of the incremental distance traveled by the wheels during an interval between pulses. This $K_1$ constant is delivered to the multiplier 122 from the constants storage facility 96 via line 98. The product of the multiplication of the average pulse count (APC) and the $K_1$ constant is the then current segment length (SL) and which is then delivered from the an output terminal of the multiplier 122 to an input terminal of a data labeler 124 via line 123.

Here at the data labeler 124, the segment length (SL), by an input to the labeler 124 along line 125, is labeled as either a forward moving (+) or backward moving (−) segment length. Such forward or rearward information signals (F/R) may be readily obtained from suitable sensors of components of the vehicle which have differing movement characteristics and/or positions equatable to overall forward and rearward movements of the vehicle. Once appropriately labeled at the labeler 124, the current labeled segment length (LSL) is delivered via line 126 to the coordinates generation system for use in computing both the longitude and latitude coordinates. The current labeled segment length (LSL) is also continuously delivered to a normally closed gate 128 via another line 127 and where current value of the labeled segment length is continuously impressed until such time as a system termination pulse (STP) is received from the threshold detector in system 104. This pulse (STP) serves to end the segment length computation process in system 103 and opens the gate 128 and thus enables the then current value of the labeled segment length (LSL) to be forwarded via line 130 to the data base storage facility 131. The pulse delivered to system 103 also serves to reset the counters 112 and 113 and thus commence the computation procedures for the next linear segment encountered in the route traversal.

Reference is now made to the azimuth computation system 104 illustrated in FIG. 11. In system 104, the azimuth is computed for the segment forming the subject matter of the length computation in system 103. It should be pointed out that the change in azimuth ($\Delta\theta$) between successively occurring segments in the data base for a route, as computed in accord with the preferred method of compiling the route data base herein, is the same except for a clockwise (+) or counterclockwise (−) direction in the change of the azimuth.

As will be seen below, the equal change in azimuth between successive segments in the serial order is accomplished by a comparative procedure which involves a continual computation of the changes in the vehicle heading as a segment is being traversed. These changes are continually compared against a predetermined threshold direction change value and which, upon the occurrence of a match, terminates the length and coordinate computations and starts the computations for the next segment traversed.

With the above in mind, the current total left wheel pulse count (TLWPC) from counter 112 and the current total right wheel pulse count (TRWPC) from counter 113 (See: FIG. 10) are passed via lines 115 and 120 respectively to a pulse count subtractor 135 in the azimuth computation system 104. Here at the subtractor 135, the current total right wheel pulse count (TRWPC) is subtracted from the then current total left wheel pulse count (TLWPC). This provides a positive (+) or negative (−) pulse count difference (PCD) in the output line 136 of the subtractor 135 and which, of course, is indicative of a clockwise or counterclockwise direction in the azimuth change ($\Delta\theta$) contemplated by the computations in the system 104.

The current pulse count difference (PCD) in the output line 136 of subtractor 135 is then impressed upon an input terminal of a multiplier, designated at 137. Also impressed upon another input terminal of the multiplier 137, as via line 98, is the constant ($K_1$) which, as heretofore explained, is indicative of the predetermined increment of distance traveled during the interval between the pulses generated by the wheel sensors. As indicated in FIG. 11, the then current pulse count difference (PCD) and the constant ($K_1$) derived from the program constants storage 96 via line 98 are multiplied to provide, as an output in line 138 from the multiplier 137, the current difference in distances traveled ($\Delta d$) by the wheels 13 and 14 during their traversal of the segment course. This output from the multiplier 137 is delivered to a divider 139 via line 138 and is also sent to a threshold detector 140 via another line 141.

The computations commencing at the divider 139 ultimately lead to the computation of the azimuth ($\theta_A$) of the segment then forming the subject matter of the length computation in system 103. Thus, the difference in distance ($\Delta d$) traveled by the wheels of the assembly is divided in divider 139 by the constant ($K_2$) derived via line 99 from the constants storage facility 96. As previously indicated, this constant ($K_2$) is indicative of the difference in distance travel by the wheels to effectuate a 1° change in the azimuth of the wheel assembly or vehicle. The output from the divider 139 in line 142 is indicative of the current change in azimuth ($\Delta\theta$) of the segment involved in the length computations of system 103 and is delivered to an input terminal of an adder, designated at 143. Also delivered to an input terminal of the adder 143, as via line 144, is the azimuth ($\theta_o$) of the last segment forming the subject matter of a length computation in system 103 and which is retrieved from storage in the data base storage facility 131.

The addition accomplished in the adder 143 provides the current azimuth ($\theta_A$) of the segment then forming the subject matter of the length computation in the system 103. The current azimuth ($\theta_A$) of the segment is passed via line 146 to the end point coordinate computation system 105 for use therein in computing the terminal end point coordinates for the segment. The azimuth ($\theta_A$) of the segment is simultaneously impressed, via line 145, upon an input terminal of a normally closed gate 147. Here the azimuth ($\theta_A$) is continuously updated until such time as a gate opening system termination pulse (STP) is provided via line 148 from the threshold detector 140.

The current value of the difference in distance ($\Delta d$) traveled by the wheels of the vehicle assembly is also continually passed from the multiplier 137 to an input terminal of the threshold detector 140, as via line 141. The detector's 140 primary function is to establish an equal change in azimuth ($\Delta\theta$) between segments that successively form the subject matter of descriptions stored in the data base storage facility. As such, the threshold detector 140 also severs as the provider of the system termination pulse (STP) which simultaneously opens those gates which serve to block passage of the current location and orientation data to the storage facility until such time as the data particulars for defining the segment are completed.

As such, the current difference in distance traveled by the wheel ($\Delta d$) is delivered via line 141 to the threshold detector 140 and the constant ($T_1$) is also delivered to an input terminal of the detector 140 from the program constant storage facility 96, as via line 150.

The constant ($T_1$) establishes the threshold distance value indicative of the deviation from the projected azimuth of the previous segment that must be attained in the comparative process to permit transfer of the then current segment location and orientation data to the storage facility 131. When the value of the difference in distances ($\Delta d$) traveled by the wheels equals the distance established by the predetermined constant ($T_1$) as determinative of the limiting factor governing the deviation in the heading between route segments, the detector 140 generates the system terminating pulse (STP). Such is then transmitted to the segment length and coordinate computation systems 103 and 105 via lines 129 and 151. The system terminating pulse (STP), as previously indicated, is also delivered to gate 147, via line 145, so as to also open this gate 147 and permit transfer of the most currently calculated azimuth ($\theta_A$) to the storage facility 131 via line 152

The computations in the end point coordinates computation system 105 occur as the vehicle traverses the segment forming the subject matter of the current computations in the length and azimuth data generating systems 103 and 104. The computations in system 105 basically involve a continual computation and updating of the end point coordinates for the segment and which are based on the current segment length and azimuth information that is continually being provided from the length data generating system 103 and the azimuth data generating system 104. As previously indicated the current azimuth information is provided via line 146 to both the longitude and latitude computing systems 106 and 107 of the end point coordinate computing system 105. However, the segment defining end point coordinates which are ultimately delivered to the data base storage facility are those that are current when the system termination pulse (STP) is generated in the azimuth computation system 104 and delivered to the coordinate computation 105, as will be seen below.

Reference is now made to FIG. 12 and to the coordinates computation system 105 contemplated therein. The system 105 includes a longitude computation system 106 and a latitude computation system 107. Each of the systems 106 and 107 operates in dependency upon continuous receipt of current labeled segment length (LSL) data from system 103 and current azimuth ($\theta_A$) data from system 104. Each of the systems 106 and 107 also operates to continuously compute the respective current longitude and latitude coordinates of the terminal end point of the segment and which are also delivered to respective gates that must be opened to deliver the coordinates to the data base storage facility. As such, each system 106 and 107 receives a gate opening system terminating pulse (STP) from the azimuth computation system 104 to terminate the system computations.

Referring first to the latitude data generating system 107, the current azimuth ($\theta_A$) of the segment forming the subject matter of the computations is delivered from the azimuth data generating system 104 and continuously delivered to a cosine angle determinator 155 of the latitude data generating system 107 via line 146. Here the cosine of the azimuth ($\theta_A$) is computed by means well known, or alternatively retrieved from a stored data base of cosine angular values, and provided in line 156 as a cosine output of the azimuth (cosine $\theta_A$) from the angle determinator 155. The cosine output in line 156 is delivered to an input terminal of a multiplier, designated at 157, and the current labeled segment length (LSL) derived from the length data generating system 103 is also continuously delivered to an input terminal of the multiplier via line 126. Here, the two values delivered to the multiplier 157 are multiplied and provided in output line 158 as the change in latitude ($\Delta Y$) between the end of the segment at the commencement of its traversal and the other end of the segment at the termination of the segment traversal. The change in latitude ($\Delta Y$) is then delivered via line 158 to an input terminal of an adder 159 to which the latitude ($Y_O$) at the connection with the prior segment is delivered from the data base storage facility 131 via line 160. The sum of the two values fed to the adder 159 provide the latitude ($Y_1$) at the terminal end point of the segment and this value is delivered to a normally closed gate 162 via line 161. The latitude ($Y_1$) delivered to gate 162 is continually up dated until the system terminating pulse (STP) in generated in system 103 and delivered to the gate via line 151 to thereby open the gate 162 and release the latitude ($Y_1$) for delivery to the storage facility 131 via line 163.

Referring now to the longitude data generating system 106, the current azimuth ($\theta_A$) of the segment forming the subject matter of the computations is delivered from the azimuth data generating system 104 and continuously delivered to a sine angle determinator 166 of the longitude data generating system 106 via line 146. Here the sine of the azimuth ($\theta_A$) is computed by means well known, or alternatively retrieved from a stored data base of sine angular values, and continuously provided in line 167 as the current sine output of the azimuth (sine $\theta_A$) from the angle determinator 166. The current sine output in line 167 is continuously delivered to an input terminal of a multiplier, designated at 168, and the current labeled segment length (LSL) derived from the length data generating system 103 is also continuous delivered to an input terminal of the multiplier 168 via line 126. Here, the two values delivered to the multiplier 168 are multiplied and provided in output line 169 as the current change in longitude ($\Delta X$) between the end of the segment at the commencement of its traversal and the other end of the segment at the termination of the segment traversal. The change in longitude ($\Delta X$) is then delivered via line 169 to an input terminal of another multiplier designated at 170. Here at multiplier 170, a longitude spherical correction factor (LCF) is delivered to the multiplier via line 171. The product of the change in longitude ($\Delta X$) and the longitude correction factor (LCF) is then continuously delivered from the multiplier 170 as the current spherically corrected change in longitude (SC$\Delta X$) which via line 172 is delivered to an adder 173. The longitude at the starting end of the segment traversal ($X_O$) is also delivered to the adder 173 as via 174. The sum of the longitude at the starting end of the segment ($X_O$) and the spherically corrected change in longitude (SC$\Delta X$) provides the then current longitude ($X_1$) at the terminal end point of the segment in the output line 175 of the adder. Line 175 connects to an input terminal of a normally closed gate 176 and upon delivery of a segment terminating pulse (STP) from the azimuth data generating system 104, as via line 151, the gate is opened and the longitudinal component ($X_1$) passes to the storage facility 131 via line 177.

The spherical correction factor (LCF) is introduced in the computation of the longitude of the end point of the segment so as to compensate for the spherical convergence of the longitudinal coordinates with increasing latitude changes. The system for computing the longitude correction factor (LCF) is designated at 178. The value of the latitude ($Y_O$) at the start of the segment traversal (i.e. at the terminal end point of the last segment traversed by the vehicle wheel assembly) is determined by appropriately addressing the data stored in the data base storage facility 76, and by delivering it to the system 178 for computing the correction factor as via line 160. The longitude correction factor (LCF) is computed as indicted by equation 6 and is delivered to the multiplier 170 via line 171 as previously indicated.

$$LCF = 1 - Y_0/90 \quad (6)$$

where:
LCF=longitude correction factor, and
$Y_O$=the latitude at the starting point for the segment length computation. (degrees).

Figure 13:
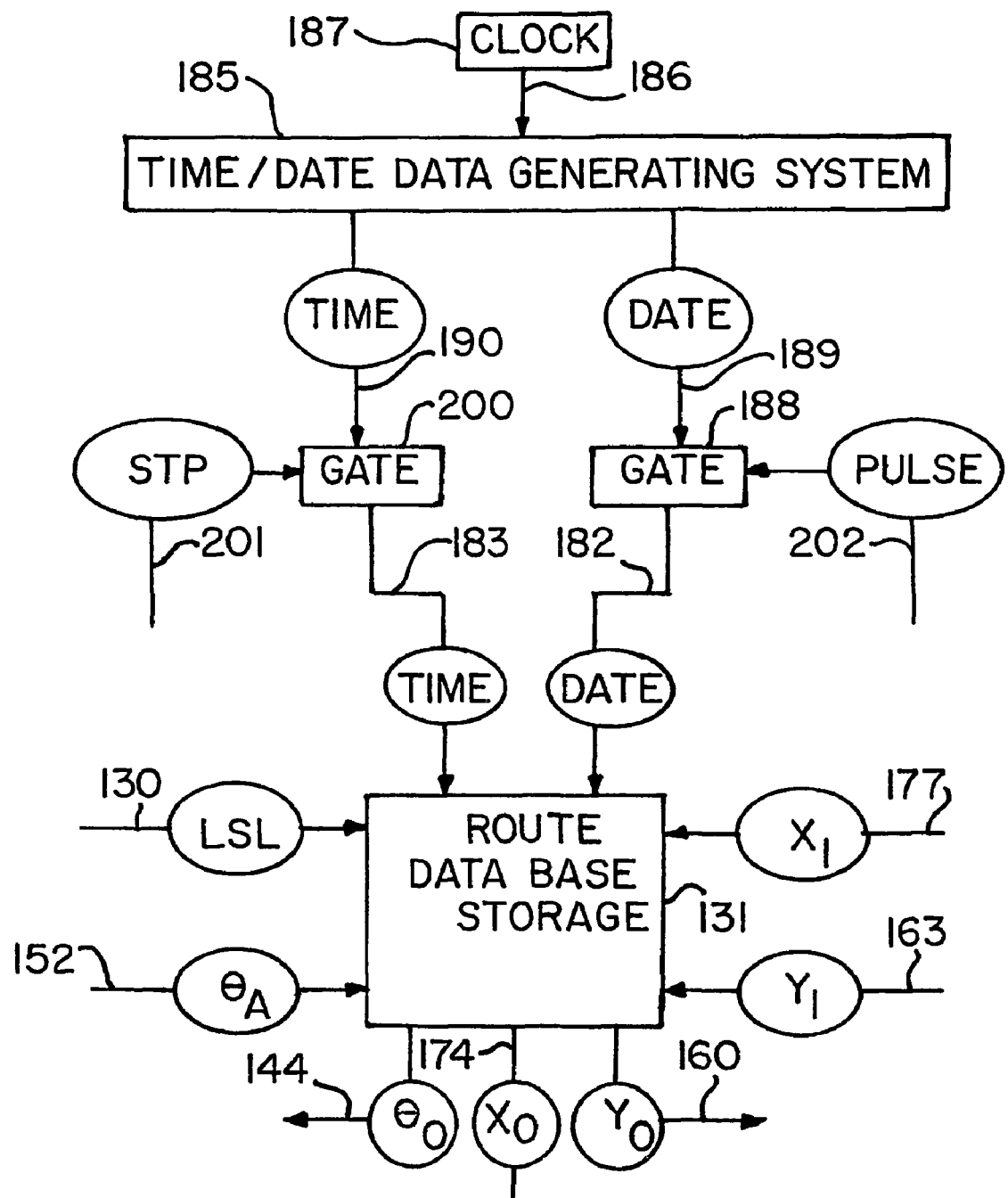
FIG. 13 schematically illustrates a computer route data base storage facility for the computed data generated by procedures generally illustrated in FIGS. 9 thru 13 and also schematically illustrates a system for time dating the entry of data relevant to the location and orientation of the linear segments of the route.

The route data base generating system has various uses and among those is a use for monitoring the driving habits of minors, and drug and alcohol addicts, among others. Thus, if a vehicle is equipped with a system for generating a route data base such as contemplated herein, the route data base can serve as an index of the drivers whereabouts and driving habits during a tour with the vehicle and especially if the route segment data entries are time dated upon entry to the storage facility for the data base. To this end, FIG. 13 illustrates a system for accomplishing this objective.

As seen therein, a time/date data generating system operates in dependency upon receipt of an output 186 of the computer clock 187 to generate data both indicative of the current date and the current time of day. A separation of the date and time of day when the relevant segment location and orientation data are stored facilitates a more efficient use of the data storage facilities by eliminating the need for repetitious date entries at the entry times for the relevant segment data. In any event, data indicative of the current date is continuously delivered from the system 185 via line 189 and impressed upon an input terminal of a normally closed gate 188. This gate 188 is opened to enable passage, via line 182, of the data to the route data base storage facility 131 by an appropriate pulse delivered via line 202 that may, for example, be delivered to the gate 188 at the commencement of operation of the data base generating system and thereafter periodically throughout the course of events that transpire during the segment data generation and compiling process.

The data indicative of the current time of day, on the other hand, is continuously delivered from the system 185 via line 190 and impressed upon an input terminal of another gate, designated at 200. This gate is opened upon reception of the segment termination pulse (STP), via line 201, and which also triggers the entry of the generated segment location and orientation data to the storage facility 131. As such, the occurrence of the segment data entries in die storage facility 131 are timed by association in the data base with the time of day entry made in response to the same segment terminating pulse that triggered die entry of the segment location and orientation data. The timed entry of segment data is, of course, also dated by reference to the last date entry in the data base. When gate 200 is opened, it permits the time data to pass to the data base storage facility via line 183.

As indicated previously, the invention has to do with the generation and compilation of a route data base that that may be used for various purposes. Among such uses may be mentioned (a) the production of maps that include die route, (b)

the reconstruction and proof of driving events that have occurred prior to, during and/or following accidents involving the vehicle participating in the generation process, (c) the reconstruction and proof of the driving habits of drivers of a vehicle and who are under court ordered, parental or some other imposed driving restriction to name but a few at this point. In some of such contemplated uses, the time and date of the generation and storage of the data relevant to the segment locations and orientations becomes important. As such, provision may be made in the computing processes to enter the time of the segment data storage events.

One of the outstanding features of the systems and procedures contemplated herein is that reliance on satellite signals from the GPS is unnecessary to compute azimuth and heading information but instead such information is readily obtainable by simply measuring the distances traveled by the wheels of conventional wheel assemblies encountered in todays vehicles.

The invention claimed is:

1. A method of generating data indicative of real time locations of a driver controlled self-propelled vehicle during its traversal of a route in an area having impaired reception of navigational signals emanating from satellites associated with a global positioning system comprising:
    progressively moving the vehicle along said route, said vehicle having a pair of wheels that are spaced apart and rotatable in ground contact about a common axis,
    generating signals indicative of predetermined incremental distance movements of each of said wheels,
    generating coordinate data during such progressive movement of the vehicle that are indicative of respective end point locations of route segments which are successively traversed by the vehicle during its movement along said route,
    generating data indicative of the length of each of said segments by a continuing measurement of the distance traveled by the vehicle during its traversal thereof and terminating the distance measurement upon the occurrence of a predetermined change in the heading of the vehicle during its traversal thereof,
    generating data indicative of the heading of the vehicle during the traversal of each of said segments, said heading indicative data being generated on the basis of a difference in incremental distance movements of said wheels during the traversal of the segment by the vehicle, and said coordinate data being generated on the basis of the length and heading indications for the segment associated therewith, and
    storing the generated coordinate data for subsequent evaluation of the driver's control of the vehicles movements along said route.

2. A method of generating a data base of a traversable route comprising:
    moving an assembly over the route, said assembly having a pair of rotatable components that are spaced apart in ground contact and rotatable about a horizontal axis, and means for detecting the distance traveled by each of said components,
    generating and compiling data definitive of the route and which is based on a division of the route into a plurality of linear segments that are interconnected and arranged in an end-to-end serial order with each segment having a determined length, orientation and location in the serial order, said generating and compiling data including measuring the distance traveled by each component during traversal of a segment by the assembly,
    determining the difference in distance traveled by the components during such traversal of the segment, and
    determining the orientation of the segment in the order based on the difference in distance determination.

3. A method of generating a data base in accord with claim 2 wherein: said generating and compiling data includes determining the length of the segment during its traversal by said assembly, and determining the coordinates of the end point of the segment upon the traversal of the segment by said assembly.

4. A method of generating a data base of a traversable route comprising:
    moving an assembly over the route, said assembly having a pair of rotatable components that are spaced apart in ground contact and rotatable about a horizontal axis and means for detecting the distance traveled by each of said components,
    generating and accumulating data definitive of the route and which is based on a division of the route into a plurality of linear segments that are interconnected and arranged in an end-to-end serial order with each segment having a determined length, orientation and location in the serial order, said generating and accumulating data including continually and incrementally measuring the distance traveled by each rotatable component as the assembly traverses a linear segment wherein incremental distance traveled is predetermined,
    continually determining the difference in distance traveled by the rotatable components as the assembly traverses a linear segment,
    continually comparing the current difference in distances traveled to a predetermined threshold different distance value as the assembly traverses a linear segment, and
    determining the length, heading and end point coordinate data of a traversed linear segment upon the occurrence of a match between said difference in distances traveled by the rotatable components as the assembly traverses the linear segment and said predetermined threshold value, and
    storing the length, heading and end point coordinate data in said data base as the accumulated data definitive of the traversed linear segment.

5. A method of generating a data base of a traversable route comprising:
    moving an assembly over the route having a pair of rotatable components that are spaced apart in ground contact and rotatable about a horizontal axis that is common to both of the components and means for detecting predetermined incremental distance movements of travel by the respective components,
    generating data definitive of the route and accumulating the data in said data base on a basis contemplating a division of the route into a plurality of linear segments that are interconnected and arranged in an end-to-end serial order over the course of the route,
    receiving and successively storing the generated data that is relevant to the location and orientation of said linear segment components in the serial order of the successive traversals thereof by said assembly,
    determining the coordinates of a starting end point for movement of said assembly over a linear segment component of the route, said starting end point being the terminal end point of a route component previously traversed by the assembly,
    determining the change in heading of said assembly in moving from said starting end point to the terminal end point of the linear segment component,
    determining the length of the linear segment component on the basis of the distance movements detected by said means for detecting, and determining the coordinates of the terminal end point of the linear segment component based on the change in heading and length determinations thereof.

6. A method of generating a data base in accord with claim 5 wherein: said change in heading is based on a difference in the distances traversed by said rotatable components during the traversal of the linear segment component.

7. A method of generating a data base in accord with claim 5 wherein: said change in heading is based on a difference in the distances traversed by said rotatable components during the traversal of the linear segment component, and said difference in the distances traveled by said rotatable components is compared to a predetermined threshold distance value which, upon the occurrence of a match there between, serves to terminate the determination of the length of the linear segment component and initiate the determination of the coordinates of the terminal end point of the route segment.

* * * * *